United States Patent Office 2,701,193
Patented Feb. 1, 1955

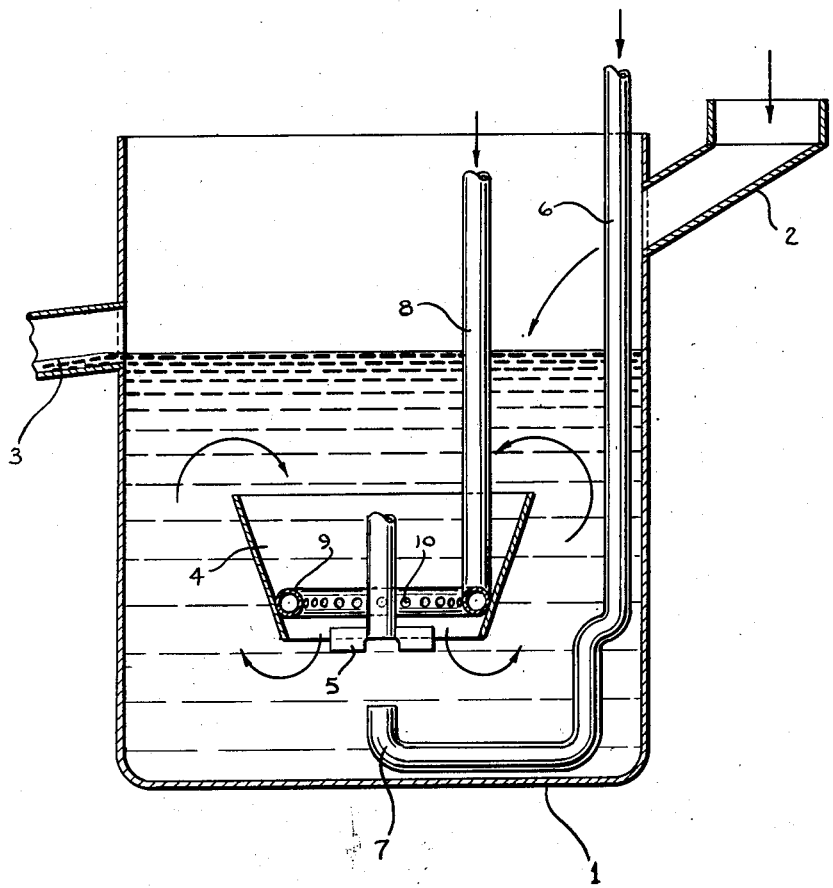

2,701,193

MANUFACTURE OF FERTILIZERS

Charles Heudier, Grand-Quevilly, and Michel Staub, Rouen, France, assignors to Societe Anonyme des Manufactures des Glaces et Produits Chimiques de Saint-Gobain, Chauny & Cirey, Paris, France Application March 19, 1952, Serial No. 277,472

4 Claims. (Cl. 71—37)

This invention relates to improvements in the manufacture of fertilizers.

Phospho-nitrate fertilizers are made by attacking phosphate of fertilizer grade, such as natural phosphate by nitric acid alone or mixed with other acids, of which sulphuric acid is exemplary. The product produced by the acid attack is ammoniated to neutrality either before or after the removal of the calcium nitrate formed during the acid attack. The ammoniation of the fluid mass resulting from the acid attack is accompanied by serious difficulties of which several will be briefly mentioned. The reaction with ammonia is exothermic and brings the mass to a boil, which is harmful. The ammoniation is accompanied by the precipitation of dicalcium phosphate and there is a progressive thickening and stiffening of the fluid mass which accompanies this precipitation and which interferes with the handling of the mass, reduces the efficiency of the ammoniation, extends the time required for the treatment, increases the pieces of apparatus necessary for the process and enlarges the capital investment. The rise in temperature to the boiling point favors the mono-calcium phosphate and dicalcium phosphate present in the fluid mass to come back to the tricalcium phosphate stage. This has led, heretofore, to the necessity of restricting boiling to limited zones of precisely controlled pH, but that is very difficult to control and cannot be carried out in all stages of the process. It further requires limitations on the rate of ammoniation and the employment of other means of control to keep the temperature down in those steps of the process where boiling is not permitted.

As the ammoniation progresses, the mono-calcium phosphate, which is soluble in water, is transformed to insoluble dicalcium phosphate and the introduction of ammonia into the fluid mass becomes more and more difficult, particularly towards the end of the ammoniation at which the acceptance of ammonia by the mass is not over $\frac{1}{10}$ of that existing at the beginning.

At the end of the process it has been necessary to remove water from the product by evaporation, which is a delicate operation which must be carried out with strict controls.

It is an object of this invention to improve the process of preparing such phospho-nitrate fertilizers so as to avoid the necessity of controlling the acidity of the fluid mass, so as to control the temperature and avoid boiling without the apparatus and methods previously employed, to prevent the retrogradation of the mono and dicalcium phosphate during boiling, to reduce the quantity of apparatus and the cost of installations and to increase the productive capacity of installations, to speed up the ammoniation while maintaining a reaction temperature below boiling, to increase the power of the fluid mass to assimilate ammonia, particularly toward the end of the ammoniation, and to produce a product having a lower content of water.

The objects of the invention are accomplished generally speaking by simultaneously ammoniating and aerating the fluid mass resulting from the reaction of such acid with phosphate of fertilizer grade. In practice, it is particularly advantageous to aerate the fluid mass just before it is ammoniated, particularly when large masses are being handled, but the ammonia and air can be mixed in advance and used satisfactorily, particularly when the mass to be ammoniated is of moderate size. The air and ammonia can, thus, be injected in the mass at the same place or at different places, and the injection of the ammonia and air may be simultaneous or sequential, as for instance admitting some air and then ammonia and thereafter frequently repeating the alternate injections.

In practice, it is usually satisfactory to inject an air stream drawn from the atmosphere into the reaction mass, but the air may be dried in advance, if desired. The air is introduced in a quantity sufficient to keep the reaction mass at an even temperature below boiling. The quantity of air to be employed is important, but does not require any careful measurement or analysis because of the discovery that the temperature of the reaction mass falls below boiling when the minimum quantity of air producing the advantages of the invention is employed. Consequently, it is only necessary for the operator to adjust the flow of air into the reaction vat, increasing the flow whenever the temperature rises toward the boiling point. As an excess of air is not harmful, and sometimes produces additional benefits, the process is easy to control.

Other methods used to estimate the quantities of air are also useful, for instance, equal quantities of air and ammonia generally produce satisfactory results, although it is sometimes advantageous to use a larger quantity of air than ammonia.

One of the results of this process is difficult to explain on the basis of the knowledge heretofore existing. It has been estimated that with this invention practically all the heat liberated in the reaction is used to evaporate the water and saturate the injected air, practically none of the heat being used to degrade the product, which is a fault of prior process; and this results in a material concentration of the fluid, which occurred to a lesser extent heretofore, and always resulted in a thickening and stiffening of the mass which made the later stages of the ammoniation too slow and inefficient. Therefore, one would think that the greater concentration introduced by this invention and the more rapid concentration, would add to these difficulties, but it is a discovery that the process of this invention actually allows the use of greater quantities of ammonia and a faster rate of ammoniation, as though the presence of the air has activated the mass and made it readily susceptible to ammoniation. This has been demonstrated in two identical installations, each of which contained five successive vats of identical size and surfaces, operating at the same temperature, with identical quantities of identical materials, except that the second received air in addition to ammonia. The first of these apparatuses was operated according to the prior art, ammoniation being commenced in the first vat and continued in each succeeding vat. The ammonia was admitted at the fastest rate at which it could be absorbed into the fluid mass. The following figures show the quantities of ammonia that are absorbed in each of the vats, the left hand column showing vats 1 to 5 of the first group and the kgs. of ammonia absorbed per hour in each vat. In the second column is shown the quantities of ammonia absorbed per hour in each of the five vats of the second installation.

Ammoniation without aeration:
    Vat 1  250 K. of $NH_3$ per hr.
    Vat 2  170 K. of $NH_3$ per hr.
    Vat 3   75 K. of $NH_3$ per hr.
    Vat 4   50 K. of $NH_3$ per hr.
    Vat 5   25 K. of $NH_3$ per hr.
                570

Ammoniation with aeration:
      300 K. of $NH_3$ per hr.
      250 K. of $NH_3$ per hr.
      200 K. of $NH_3$ per hr.
      150 K. of $NH_3$ per hr.
      100 K. of $NH_3$ per hr.
    1,000

The air was admitted in conformity with the quantities hereinbefore discussed.

By the foregoing figures, it is shown that the invention permits doubling the rate of ammoniation of the fluid mass and doubles the quantity admitted in a given time. This permits the reduction of the number of vats to a half or less, or with an existing installation to double the production. In particular, the rate of ammoniation at the end of the process is four times that of the prior art. In particular, employing an installation without aeration, the evaporation of water during ammoniation is negligible and it is necessary to conduct a later and very delicate concentration with the use of fuel adding to the cost. On the other hand, with this invention, material evaporation occurs during the ammoniation, and tends to make any subsequent ammoniation or evaporation unnecessary.

The invention can be put into use in various ways, the simplest, and a satisfactory method in apparatus having a moderate rate of production, is to mix the air and ammonia before injecting them into the fluid mass. When the higher rate of production is desired, this method is less satisfactory because of the volumes of gas, some of which may escape before absorption, with loss of the ammonia, it is better to introduce the air and the ammonia in distinct zones. To accomplish this satisfactorily, a practically advantageous method has been developed and a novel apparatus to carry out the method. This method includes circulating the mass within a vat, aerating it first and immediately afterward ammoniating it. This permits one to introduce ammonia at a rate previously unattainable without raising the temperature so high as to degrade the product. This method and the novel apparatus are illustrated in the accompanying drawing, wherein the mass is circulated within a reaction vat and reacted first with air and thereafter with ammonia.

In this drawing, the numeral 1 represents a cylindrical reaction vat provided with a chute 2 for the admission of the fluid mass resulting from the acidification of natural phosphate. At the opposite side an overflow discharge port 3 is provided in the wall of the vat and serves to establish the level of the mass in the vat. Centrally located in the vat, above the bottom and below the level of the fluid mass, is a funnel 4 within which an impeller 5 acts to circulate the reaction mass from above toward the bottom. Within the funnel is a circular pipe 9 provided with inwardly directed holes 10 and connected at one side with a pipe 8 through which air is forced by any suitable means not shown. As the reaction mass passes downwardly through the funnel it passes through the ring 9 and is subjected to aeration by air injected through holes 10. Beneath the funnel is a pipe nozzle 7 which receives ammonia through pipe 6 and directs it upwardly, counter-current to the current of aerated fluid mass established by the impeller 5 and the ring 9. This apparatus produces excellent results and accomplishes the objects of the invention. The following examples are based upon the use of such apparatus to the extent that they refer to this invention.

*Example 1*

A fluid reaction mass was used resulting from the attack on moroccan phosphate by nitric acid, and after having had calcium nitrate eliminated by filtration, or after the addition of phosphoric acid in sufficient quantity to bring the value of the molecular proportion $$\frac{P_2O_5 \text{ soluble}}{CaO \text{ soluble}}$$

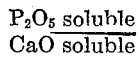

to about 2, and analyzing 14.5% of $P_2O_5$, 7.25% of nitric nitrogen, 12.7% CaO and 35% water, was ammoniated.

The ammoniation of this fluid mass required about 710 kgs. of ammonia for 8 metric tons of the mass in order to change the nitric nitrogen to the state of ammonium nitrate and to change the greater part of the phosphate to dicalcium phosphate.

During the ammoniation, the fluid mass was considerably thickened so that the absorption of ammonia was reduced to 250 kgs. per hour, at the beginning, to 25 kgs. per hour at the end and furthermore the mass was rapidly brought to its boiling point. These results are characteristic of the prior art. The final product contained 28 to 30% of water and a substantial part of the $P_2O_5$ had retrogressed to a non-assimilable state.

On the other hand when this invention was employed on an identical mass, air being injected simultaneously with the ammonia at a rate of 1.3 to 1.5 times that of the ammonia (1 part by weight of ammonia to 1.3 to 1.5 parts by weight of air). The temperature of the reaction mass remained below the boiling point throughout the reaction and the input of ammonia was at all times greater than was possible by prior art methods, being 150 kgs. per hour at the end of the operation. The reaction product only contained about 20% of water and 98% of $P_2O_5$, that is, practically all was undegraded and assimilable.

*Example 2*

The process of the invention was applied to a fluid mass resulting from the action of mixed sulphuric nitric acids upon natural phosphate of fertilizer grade without removing the calcium sulphate formed during the reaction. Such masses, containing calcium sulphate, are more difficult to treat than those which have been clarified. The ammoniation reaction was first carried out without aeration, beginning with an absorption of 200 kgs. per hour and ending with absorption of 15 kgs. per hour, the product containing 22% of water.

When carried out according to the invention, with aeration and ammoniation simultaneously, the air being injected at a rate varying between equal to that of ammonia to 1.5 times that of the ammonia, the absorption of ammonia at the beginning of the reaction was 250 kgs. per hour, and at the end 60 kgs. per hour. The final product contained only about 16% of water.

This invention relates to an improvement in making fertilizers of phospho-nitrate type in which the mass resulting from the acidification of phosphate of fertilizer grade is neutralized by ammoniation with the simultaneous formation of dicalcium phosphate. The invention is characterized by simultaneous ammoniation and aeration of the mass and it involves the following points of the novelty taken separately or together.

1. The air is admitted at a rate such that the reaction mass does not boil, but while preferably keeping the temperature slightly below the boiling point.
2. The air and ammonia are injected as a mixture.
3. The air and ammonia are introduced in different portions of the reaction vat.
4. The ammonia is passed counter to a current of aerated reaction mass.

The apparatus also constitutes an invention and involves a vat provided with a centrally located funnel associated with an impeller which circulates the reaction mass from above downward counter-current to an upwardly directed injection of ammonia gas, the aeration being accomplished within the funnel by a ring-shaped injector.

As many apparently widely different embodiments of the present invention may be made without departing from the spirit and scope thereof, it is to be understood that the invention is not limited to the specific embodiments.

What is claimed is:

1. The method of preparing fertilizer from an acidification product analyzing about 14.5% $P_2O_5$, 7.25% nitric nitrogen, 12.7% CaO and 35% $H_2O$ that comprises ammoniating the said product by admitting gaseous ammonia thereto, at a rate that equals about 300 K./hr. at the start and 150 Kg./hr. toward the end of the operation, and aerating the mass with air at a rate of about 1.3 to 1.4 times the amount of ammonia, the amount of air admitted being varied to keep the temperature of the reaction mass slightly below the boiling point.

2. The method of preparing fertilizer from a phosphate acidification product resulting from an attack by $HNO_3$ and $H_2SO_4$ and containing $CaSO_4$ that comprises ammoniating the mass without dilution by water by introducing gaseous ammonia therein at a rate of about 250 K./hr. at the start and 60 K./hr. at the end, and aerating the mass by introducing air within it at a rate about 1 to 1.5 times the rate of admitting ammonia, thereby maintaining the mass at a temperature slightly below boiling.

3. A process of manufacturing a fertilizer containing nitrate and phosphate radicals that comprises attacking phosphatic raw material of fertilizer grade with an acid comprising nitric acid, forming a sludge, and injecting air and ammonia into the sludge formed by said attack, the air being injected during the period of addition of the ammonia, forming dicalcium phosphate and ammonium nitrate, and regulating the said injection of air to the sludge to maintain the sludge at a temperature slightly below its boiling point.

4. A process of ammoniating a sludge, containing calcium nitrate and initially about 35% water, resulting from the attack of an acid, comprising nitric acid, on phosphate of fertilizer grade, that comprises injecting ammonia into the said sludge, injecting air into the sludge during the injection of the ammonia, and regulating the injection of air to keep the sludge at a temperature just below the boiling point thereof.

References Cited in the file of this patent

UNITED STATES PATENTS

| | | |
|---|---|---|
| 1,849,704 | Boller | Mar. 15, 1932 |
| 1,872,024 | Bates | Aug. 16, 1932 |
| 1,880,470 | Ober et al. | Oct. 4, 1932 |
| 1,949,129 | Oehme | Feb. 27, 1934 |
| 1,968,323 | Sperr | July 31, 1934 |
| 1,999,026 | Tramm et al. | Apr. 23, 1935 |
| 2,037,706 | Curtis | Apr. 21, 1936 |
| 2,531,798 | Werner | Nov. 28, 1950 |
| 2,587,367 | Moritz | Feb. 26, 1952 |
| 2,600,253 | Lutz | June 10, 1952 |